(12) United States Patent
Tabbara et al.

(10) Patent No.: US 7,043,545 B2
(45) Date of Patent: *May 9, 2006

(54) SYSTEM AND METHOD FOR RESTRICTING DATA TRANSFERS AND MANAGING SOFTWARE COMPONENTS OF DISTRIBUTED COMPUTERS

(75) Inventors: Bassam Tabbara, Seattle, WA (US); Galen C. Hunt, Bellevue, WA (US); Aamer Hydrie, Seattle, WA (US); Steven P. Levi, Redmond, WA (US); David S. Stutz, Redmond, WA (US); Robert V. Welland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/007,828

(22) Filed: Dec. 8, 2004

(65) Prior Publication Data

US 2005/0102404 A1    May 12, 2005

Related U.S. Application Data

(63) Continuation of application No. 09/695,820, filed on Oct. 24, 2000, now Pat. No. 6,886,038.

(51) Int. Cl.
*G06F 15/173* (2006.01)
(52) U.S. Cl. ...................... 709/223; 709/224; 709/225; 709/229
(58) Field of Classification Search ................ 709/223, 709/224, 225, 229, 245; 713/200, 201, 202
See application file for complete search history.

(56) References Cited

U.S. PATENT DOCUMENTS

| 5,031,089 A | 7/1991 | Liu et al. |
| 5,220,621 A | 6/1993 | Saitoh |
| 5,430,810 A | 7/1995 | Saeki |
| 5,475,817 A | 12/1995 | Waldo et al. |

(Continued)

FOREIGN PATENT DOCUMENTS

EP    0962861    12/1999

(Continued)

OTHER PUBLICATIONS

Li Hsiang-Ling et al.; "Hardware Design of a 2-D Motion Estimation System Based on the Hough Transform" IEEE 1998 16 pages.

(Continued)

*Primary Examiner*—Bunjob Jaroenchonwanit
*Assistant Examiner*—Joseph Maniwang
(74) *Attorney, Agent, or Firm*—Lee & Hayes, PLLC

(57) ABSTRACT

A controller, referred to as the "BMonitor", is situated on a computer. The BMonitor includes a plurality of filters that identify where data can be sent to and/or received from, such as another node in a co-location facility or a client computer coupled to the computer via the Internet. The BMonitor further receives and implements requests from external sources regarding the management of software components executing on the computer, allowing such external sources to initiate, terminate, debug, etc. software components on the computer. Additionally, the BMonitor operates as a trusted third party mediating interaction among multiple external sources managing the computer.

26 Claims, 9 Drawing Sheets

U.S. PATENT DOCUMENTS

| | | | |
|---|---|---|---|
| 5,748,958 A | 5/1998 | Badovinatz et al. | |
| 5,768,271 A * | 6/1998 | Seid et al. | 370/389 |
| 5,801,970 A | 9/1998 | Rowland et al. | |
| 5,826,015 A | 10/1998 | Schmidt | |
| 5,872,914 A | 2/1999 | Walker, Jr. et al. | |
| 5,895,499 A * | 4/1999 | Chu | 711/202 |
| 5,948,055 A | 9/1999 | Pulsipher et al. | |
| 5,960,371 A | 9/1999 | Saito et al. | |
| 6,047,325 A | 4/2000 | Jain et al. | |
| 6,070,243 A | 5/2000 | See et al. | |
| 6,108,699 A | 8/2000 | Moiin | |
| 6,111,993 A | 8/2000 | Matsunaga | |
| 6,125,447 A | 9/2000 | Gong | |
| 6,141,749 A | 10/2000 | Coss et al. | |
| 6,151,688 A | 11/2000 | Wipfel et al. | |
| 6,192,401 B1 | 2/2001 | Modiri et al. | |
| 6,208,345 B1 | 3/2001 | Sheard et al. | |
| 6,212,559 B1 | 4/2001 | Bixler et al. | |
| 6,259,448 B1 | 7/2001 | McNally et al. | |
| 6,263,089 B1 | 7/2001 | Otsuka et al. | |
| 6,266,707 B1 | 7/2001 | Boden et al. | |
| 6,311,144 B1 | 10/2001 | Abu El Ata | |
| 6,324,571 B1 | 11/2001 | Hacherl | |
| 6,336,171 B1 | 1/2002 | Coskrey, IV | |
| 6,338,112 B1 | 1/2002 | Wipfel et al. | |
| 6,353,898 B1 | 3/2002 | Wipfel et al. | |
| 6,360,265 B1 | 3/2002 | Falck et al. | |
| 6,366,578 B1 | 4/2002 | Johnson | |
| 6,389,464 B1 | 5/2002 | Krishnamurthy et al. | |
| 6,393,456 B1 | 5/2002 | Ambler et al. | |
| 6,393,474 B1 | 5/2002 | Eichert et al. | |
| 6,427,163 B1 | 7/2002 | Arendt et al. | |
| 6,449,641 B1 | 9/2002 | Moiin et al. | |
| 6,466,932 B1 | 10/2002 | Dennis et al. | |
| 6,466,978 B1 | 10/2002 | Mukherjee et al. | |
| 6,466,984 B1 | 10/2002 | Naveh et al. | |
| 6,470,332 B1 | 10/2002 | Weschler | |
| 6,480,955 B1 | 11/2002 | DeKoning et al. | |
| 6,484,261 B1 | 11/2002 | Wiegel | |
| 6,487,622 B1 | 11/2002 | Coskrey, IV et al. | |
| 6,493,715 B1 | 12/2002 | Funk et al. | |
| 6,496,187 B1 | 12/2002 | Deering et al. | |
| 6,510,154 B1 | 1/2003 | Mayes et al. | |
| 6,510,509 B1 | 1/2003 | Chopra et al. | |
| 6,529,953 B1 | 3/2003 | Van Renesse | |
| 6,549,516 B1 | 4/2003 | Albert et al. | |
| 6,564,261 B1 | 5/2003 | Gudjonsson et al. | |
| 6,584,499 B1 | 6/2003 | Jantz et al. | |
| 6,587,876 B1 | 7/2003 | Mahon et al. | |
| 6,598,173 B1 | 7/2003 | Sheikh et al. | |
| 6,606,708 B1 | 8/2003 | Devine et al. | |
| 6,609,148 B1 | 8/2003 | Salo et al. | |
| 6,609,213 B1 | 8/2003 | Nguyen et al. | |
| 6,615,256 B1 | 9/2003 | van Ingen et al. | |
| 6,631,141 B1 | 10/2003 | Kumar et al. | |
| 6,651,101 B1 | 11/2003 | Gai et al. | |
| 6,684,335 B1 | 1/2004 | Epstein, III et al. | |
| 6,691,168 B1 | 2/2004 | Bal et al. | |
| 6,694,436 B1 | 2/2004 | Audebert | |
| 6,717,949 B1 | 4/2004 | Boden et al. | |
| 6,718,379 B1 | 4/2004 | Krishna et al. | |
| 6,728,885 B1 | 4/2004 | Taylor et al. | |
| 6,748,447 B1 | 6/2004 | Basani et al. | |
| 6,754,716 B1 | 6/2004 | Sharma et al. | |
| 6,789,008 B1 | 9/2004 | Kato et al. | |
| 6,801,528 B1 | 10/2004 | Nassar | |
| 6,801,937 B1 | 10/2004 | Novaes et al. | |
| 6,804,783 B1 | 10/2004 | Wesinger et al. | |
| 6,862,613 B1 | 3/2005 | Kumar et al. | |
| 2001/0019554 A1 | 9/2001 | Nomura et al. | |
| 2002/0095524 A1 | 7/2002 | Sanghvi et al. | |
| 2002/0194389 A1 | 12/2002 | Rawlings et al. | |
| 2003/0041139 A1 | 2/2003 | Beadles et al. | |
| 2003/0120763 A1 | 6/2003 | Voilpano | |
| 2003/0126230 A1 | 7/2003 | Donatelli et al. | |
| 2003/0154404 A1 | 8/2003 | Beadles et al. | |
| 2003/0206548 A1 | 11/2003 | Bannai et al. | |
| 2004/0054791 A1 | 3/2004 | Charkraborty et al. | |
| 2004/0078787 A1 | 4/2004 | Borek et al. | |

FOREIGN PATENT DOCUMENTS

EP    1063815    12/2000

OTHER PUBLICATIONS

Smith et al.; "Distributed Management of Future Global Multi-Service Networks" British Telecommunications EngineeringLondon GB v. 13 part 3 Oct. 1, 1994 pp. 221-226.

Somers Ferga; "Hybrid: Unifying Centralised and Distrubuted Network Management using Intelligent Agents" IEEE Network Operations and Management Symposium Kyoto Apr. 15-19, 1996. pp. 34-43.

Webster's Seventh New Collegiate Dictionary. G. C. Merriam Co. Copyright 1971 pp. 438 and 767.

Svend Frolund & Pankah Garg, "Design-Time Simulation of a Large-Scale, Distrubuted object System". ACM 1998, pp. 374-400.

* cited by examiner

SYSTEM AND METHOD FOR RESTRICTING DATA TRANSFERS AND MANAGING SOFTWARE COMPONENTS OF DISTRIBUTED COMPUTERS

RELATED APPLICATIONS

This application is a continuation of U.S. patent application Ser. No. 09/695,820, filed Oct. 24, 2000 now U.S. Pat. No. 6,886,038, entitled "System and Method for Restricting Data Transfers and Managing Software Components of Distributed Computers", which is hereby incorporated by reference herein.

TECHNICAL FIELD

This invention relates to computer system management. More particularly, the invention relates to restricting data transfers and managing software components of distributed computers.

BACKGROUND OF THE INVENTION

The Internet and its use have expanded greatly in recent years, and this expansion is expected to continue. One significant way in which the Internet is used is the World Wide Web (also referred to as the "web"), which is a collection of documents (referred to as "web pages") that users can view or otherwise render and which typically include links to one or more other pages that the user can access. Many businesses and individuals have created a presence on the web, typically consisting of one or more web pages describing themselves, describing their products or services, identifying other information of interest, allowing goods or services to be purchased, etc.

Web pages are typically made available on the web via one or more web servers, a process referred to as "hosting" the web pages. Sometimes these web pages are freely available to anyone that requests to view them (e.g., a company's advertisements) and other times access to the web pages is restricted (e.g., a password may be necessary to access the web pages). Given the large number of people that may be requesting to view the web pages (especially in light of the global accessibility to the web), a large number of servers may be necessary to adequately host the web pages (e.g., the same web page can be hosted on multiple servers to increase the number of people that can access the web page concurrently). Additionally, because the web is geographically distributed and has non-uniformity of access, it is often desirable to distribute servers to diverse remote locations in order to minimize access times for people in diverse locations of the world. Furthermore, people tend to view web pages around the clock (again, especially in light of the global accessibility to the web), so servers hosting web pages should be kept functional 24 hours per day.

Managing a large number of servers, however, can be difficult. A reliable power supply is necessary to ensure the servers can run. Physical security is necessary to ensure that a thief or other mischievous person does not attempt to damage or steal the servers. A reliable Internet connection is required to ensure that the access requests will reach the servers. A proper operating environment (e.g., temperature, humidity, etc.) is required to ensure that the servers operate properly. Thus, "co-location facilities" have evolved which assist companies in handling these difficulties.

A co-location facility refers to a complex that can house multiple servers. The co-location facility typically provides a reliable Internet connection, a reliable power supply, and proper operating environment. The co-location facility also typically includes multiple secure areas (e.g., cages) into which different companies can situate their servers. The collection of servers that a particular company situates at the co-location facility is referred to as a "server cluster", even though in fact there may only be a single server at any individual co-location facility. The particular company is then responsible for managing the operation of the servers in their server cluster.

Such co-location facilities, however, also present problems. One problem is data security. Different companies (even competitors) can have server clusters at the same co-location facility. Care is required, in such circumstances, to ensure that data received from the Internet (or sent by a server in the server cluster) that is intended for one company is not routed to a server of another company situated at the co-location facility.

An additional problem is the management of the servers once they are placed in the co-location facility. Currently, a system administrator from a company is able to contact a co-location facility administrator (typically by telephone) and ask him or her to reset a particular server (typically by pressing a hardware reset button on the server, or powering off then powering on the server) in the event of a failure of (or other problem with) the server. This limited reset-only ability provides very little management functionality to the company. Alternatively, the system administrator from the company can physically travel to the co-location facility him/her-self and attend to the faulty server. Unfortunately, a significant amount of time can be wasted by the system administrator in traveling to the co-location facility to attend to a server. Thus, it would be beneficial to have an improved way to manage server computers at a co-location facility.

Additionally, the world is becoming populated with ever increasing numbers of individual user computers in the form of personal computers (PCs), personal digital assistants (PDAs), pocket computers, palm-sized computers, handheld computers, digital cellular phones, etc. Management of the software on these user computers can be very laborious and time consuming and is particularly difficult for the often non-technical users of these machines. Often a system administrator or technician must either travel to the remote location of the user's computer, or walk through management operations over a telephone. It would be further beneficial to have an improved way to manage remote computers at the user's location without user intervention.

The invention described below addresses these disadvantages, restricting data transfers and managing software components of distributed computers.

SUMMARY OF THE INVENTION

Restricting data transfers and managing software components in clusters of server computers located at a co-location facility is described herein.

According to one aspect, a controller (referred to as the "BMonitor") is situated on a computer (e.g., each node in a co-location facility). The BMonitor includes a plurality of filters that identify where data can be sent to and/or received from, such as another node in the co-location facility or a client computer coupled to the computer via the Internet. These filters can then be modified, during operation of the computer, by one or more management devices coupled to the computer.

According to another aspect, a controller referred to as the "BMonitor" (situated on a computer) manages software components executing on that computer. Requests are received by the BMonitor from external sources and implemented by the BMonitor. Such requests can originate from a management console local to the computer or alternatively remote from the computer.

According to another aspect, a controller referred to as the "BMonitor" (situated on a computer) operates as a trusted third party mediating interaction among multiple management devices. The BMonitor maintains multiple ownership domains, each corresponding to a management device(s) and each having a particular set of rights that identify what types of management functions they can command the BMonitor to carry out. Only one ownership domain is the top-level domain at any particular time, and the top-level domain has a more expanded set of rights than any of the lower-level domains. The top-level domain can create new ownership domains corresponding to other management device, and can also be removed and the management rights of its corresponding management device revoked at any time by a management device corresponding to a lower-level ownership domain. Each time a change of which ownership domain is the top-level ownership domain occurs, the computer's system memory can be erased so that no confidential information from one ownership domain is made available to devices corresponding to other ownership domains.

According to another aspect, the BMonitor is implemented in a more-privileged level than other software engines executing on the node, preventing other software engines from interfering with restrictions imposed by the BMonitor.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
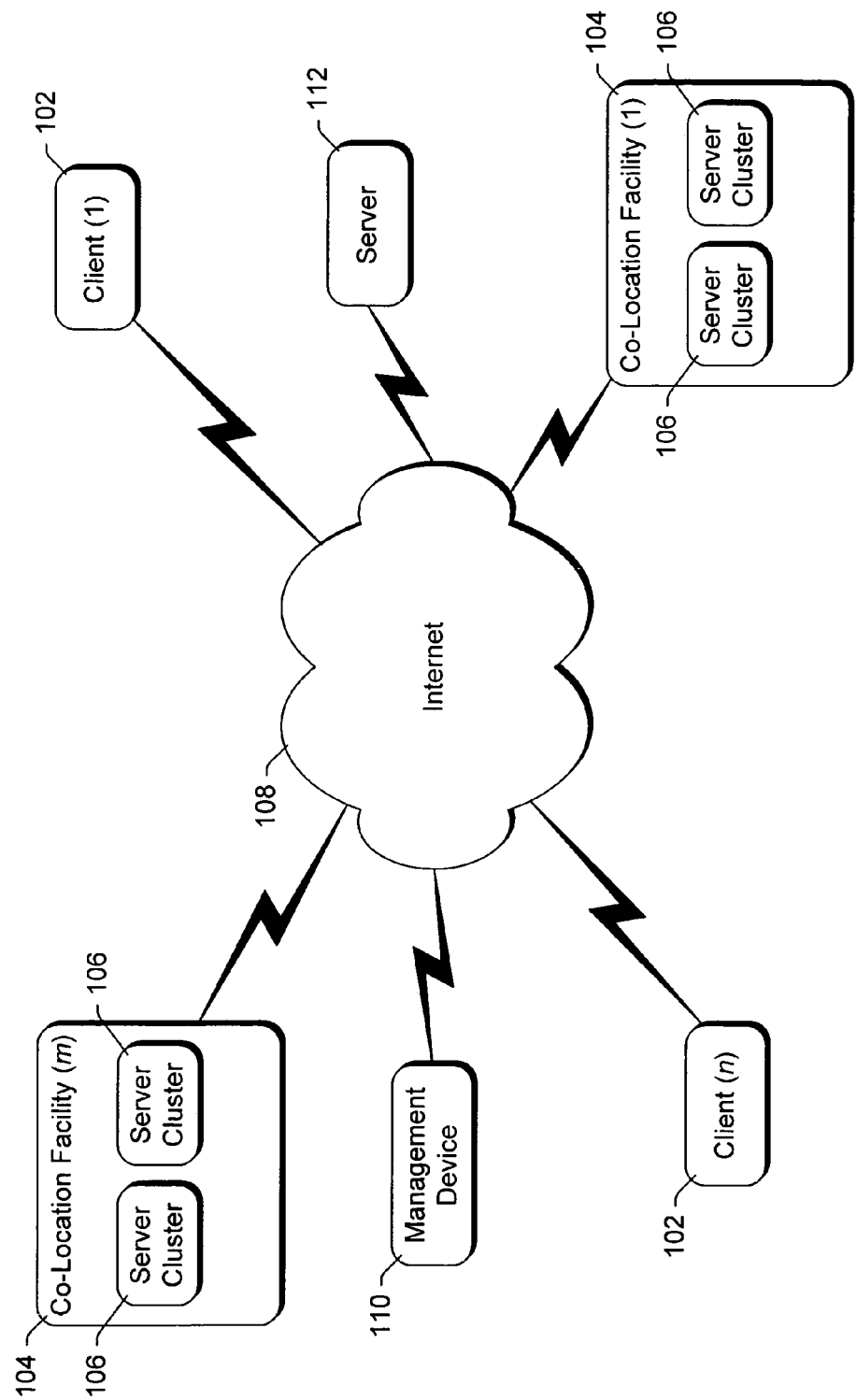
FIG. 1 shows a client/server network system and environment such as may be used with certain embodiments of the invention.

FIG. 1 shows a client/server network system and environment such as may be used with certain embodiments of the invention. Generally, the system includes one or more (n) client computers 102, one or more (m) co-location facilities 104 each including multiple clusters of server computers (server clusters) 106, one or more management devices 110, and one or more separate (e.g., not included in a co-location facility) servers 112. The servers, clients, and management devices communicate with each other over a data communications network 108. The communications network in FIG. 1 comprises a public network 108 such as the Internet. Other types of communications networks might also be used, in addition to or in place of the Internet, including local area networks (LANs), wide area networks (WANs), etc. Data communications network 108 can be implemented in any of a variety of different manners, including wired and/or wireless communications media.

Communication over network 108 can be carried out using any of a wide variety of communications protocols. In one implementation, client computers 102 and server computers in clusters 106 can communicate with one another using the Hypertext Transfer Protocol (HTTP), in which web pages are hosted by the server computers and written in a markup language, such as the Hypertext Markup Language (HTML) or the eXtensible Markup Language (XML).

Management device 110 operates to manage software components of one or more computing devices located at a location remote from device 110. This management may also include restricting data transfers into and/or out of the computing device being managed. In the illustrated example of FIG. 1, management device 110 can remotely manage any one or more of: a client(s) 102, a server cluster(s) 106, or a server(s) 112. Any of a wide variety of computing devices can be remotely managed, including personal computers (PCs), network PCs, multiprocessor systems, microprocessor-based or programmable consumer electronics, minicomputers, mainframe computers, gaming consoles, Internet appliances, personal digital assistants (PDAs), pocket computers, palm-sized computers, handheld computers, digital cellular phones, etc. Remote management of a computing device is accomplished by communicating commands to the device via network 108, as discussed in more detail below.

In the discussion herein, embodiments of the invention are described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, gaming consoles, Internet appliances, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, all or part of the invention can be implemented in one or more application specific integrated circuits (ASICs) or programmable logic devices (PLDs).

Figure 2:
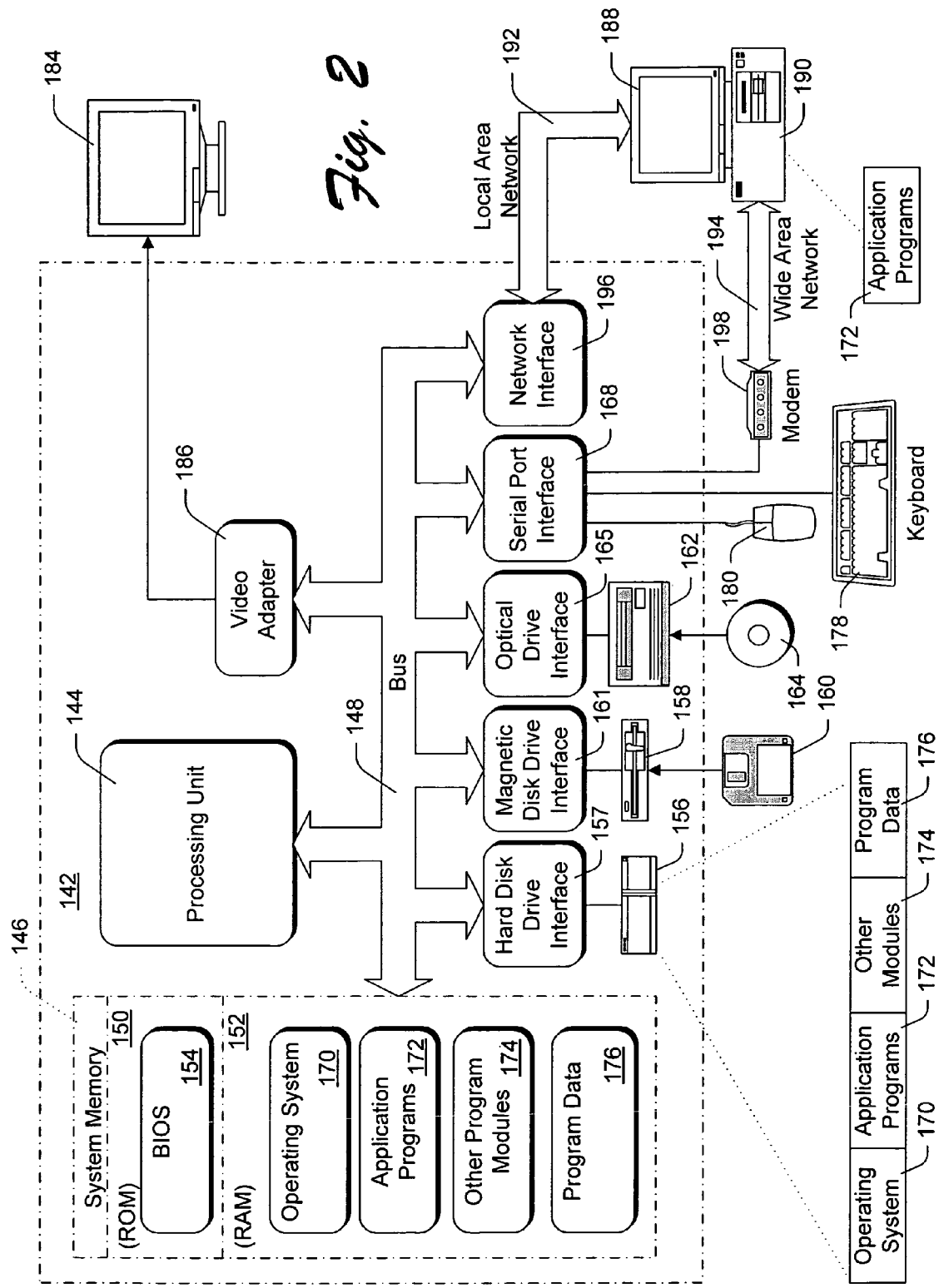
FIG. 2 shows a general example of a computer that can be used in accordance with certain embodiments of the invention.

FIG. 2 shows a general example of a computer 142 that can be used in accordance with certain embodiments of the invention. Computer 142 is shown as an example of a computer that can perform the functions of a client computer 102 of FIG. 1, a server computer or node in a co-location facility 104 of FIG. 1, a management device 110 of FIG. 1, a server 112 of FIG. 1, or a local or remote management console as discussed in more detail below.

Computer 142 includes one or more processors or processing units 144, a system memory 146, and a bus 148 that couples various system components including the system memory 146 to processors 144. The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150.

Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 optionally operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program (which may optionally be integrated into the operating system 170) such as the "Internet Explorer" Web browser manufactured and distributed by Microsoft Corporation of Redmond, Washington.

When used in a LAN networking environment, computer 142 is connected to the local network 192 through a network interface or adapter 196. When used in a WAN networking environment, computer 142 typically includes a modem 198 or other component for establishing communications over the wide area network 194, such as the Internet. The modem 198, which may be internal or external, is connected to the system bus 148 via an interface (e.g., a serial port interface 168). In a networked environment, program modules depicted relative to the personal computer 142, or portions thereof, may be stored in the remote memory storage device. It is to be appreciated that the network connections shown are exemplary and other means of establishing a communications link between the computers may be used.

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
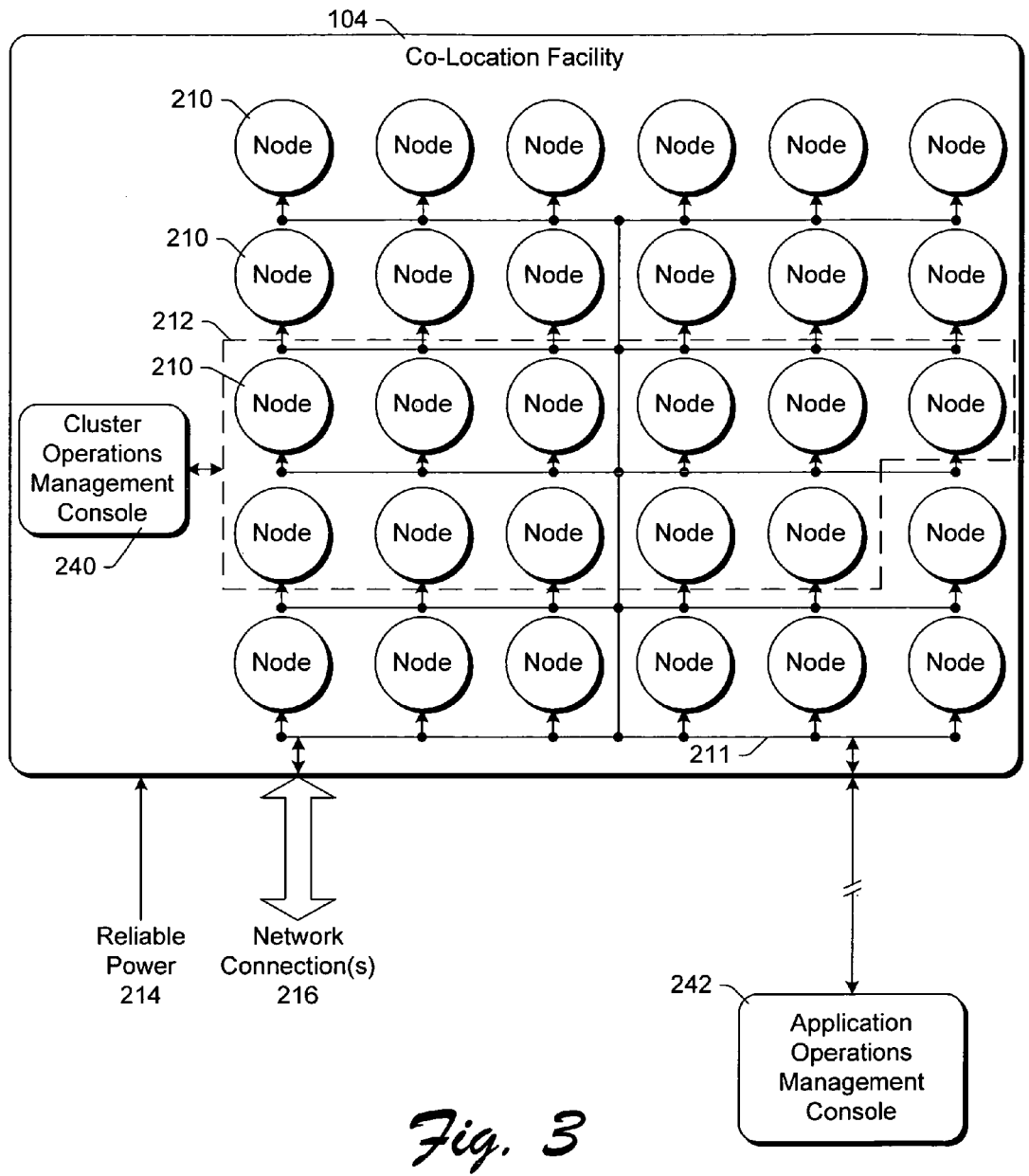
FIG. 3 is a block diagram illustrating an exemplary co-location facility in more detail.

FIG. 3 is a block diagram illustrating an exemplary co-location facility in more detail. Co-location facility 104 is illustrated including multiple nodes (also referred to as server computers) 210. Co-location facility 104 can include any number of nodes 210, and can easily include an amount of nodes numbering into the thousands.

The nodes 210 are grouped together in clusters, referred to as server clusters (or node clusters). For ease of explanation and to avoid cluttering the drawings, only a single cluster 212 is illustrated in FIG. 3. Each server cluster includes nodes 210 that correspond to a particular customer of co-location facility 104. The nodes 210 of a server cluster can be physically isolated from the nodes 210 of other server clusters. This physical isolation can take different forms, such as separate locked cages or separate rooms at co-location facility 104. Physically isolating server clusters ensures customers of co-location facility 104 that only they can physically access their nodes (other customers cannot).

A landlord/tenant relationship (also referred to as a lessor/lessee relationship) can also be established based on the nodes 210. The owner (and/or operator) of co-location facility 104 owns (or otherwise has rights to) the individual nodes 210, and thus can be viewed as a "landlord". The customers of co-location facility 104 lease the nodes 210 from the landlord, and thus can be viewed as a "tenant". The landlord is typically not concerned with what types of data or programs are being stored at the nodes 210 by the tenant, but does impose boundaries on the clusters that prevent nodes 210 from different clusters from communicating with one another, as discussed in more detail below. Additionally, the nodes 210 provide assurances to the tenant that, although the nodes are only leased to the tenant, the landlord cannot access confidential information stored by the tenant.

Although physically isolated, nodes 210 of different clusters are often physically coupled to the same transport medium (or media) 211 that enables access to network connection(s) 216, and possibly application operations management console 242, discussed in more detail below. This transport medium can be wired or wireless.

As each node 210 can be coupled to a shared transport medium 211, each node 210 is configurable to restrict which other nodes 210 data can be sent to or received from. Given that a number of different nodes 210 may be included in a customer's (also referred to as tenant's) server cluster, the customer may want to be able to pass data between different nodes 210 within the cluster for processing, storage, etc. However, the customer will typically not want data to be passed to other nodes 210 that are not in the server cluster. Configuring each node 210 in the cluster to restrict which other nodes 210 data can be sent to or received from allows a boundary for the server cluster to be established and enforced. Establishment and enforcement of such server cluster boundaries prevents customer data from being erroneously or improperly forwarded to a node that is not part of the cluster.

These initial boundaries established by the landlord prevent communication between nodes 210 of different customers, thereby ensuring that each customer's data can be passed to other nodes 210 of that customer. The customer itself may also further define sub-boundaries within its cluster, establishing sub-clusters of nodes 210 that data cannot be communicated out of (or in to) either to or from other nodes in the cluster. The customer is able to add, modify, remove, etc. such sub-cluster boundaries at will, but only within the boundaries defined by the landlord (that is, the cluster boundaries). Thus, the customer is not able to alter boundaries in a manner that would allow communication to or from a node 210 to extend to another node 210 that is not within the same cluster.

Co-location facility 104 supplies reliable power 214 and reliable network connection(s) 216 (e.g., to network 108 of FIG. 1) to each of the nodes 210. Power 214 and network connection(s) 216 are shared by all of the nodes 210, although alternatively separate power 214 and network connection(s) 216 may be supplied to nodes 210 or groupings (e.g., clusters) of nodes. Any of a wide variety of conventional mechanisms for supplying reliable power can be used to supply reliable power 214, such as power received from a public utility company along with backup generators in the event of power failures, redundant generators, batteries, fuel cells, or other power storage mechanisms, etc. Similarly, any of a wide variety of conventional mechanisms for supplying a reliable network connection can be used to supply network connection(s) 216, such as redundant connection transport media, different types of connection media, different access points (e.g., different Internet access points, different Internet service providers (ISPs), etc.).

In certain embodiments, nodes 210 are leased or sold to customers by the operator or owner of co-location facility 104 along with the space (e.g., locked cages) and service (e.g., access to reliable power 214 and network connection(s) 216) at facility 104. In other embodiments, space and service at facility 104 may be leased to customers while one or more nodes are supplied by the customer.

Figure 4:
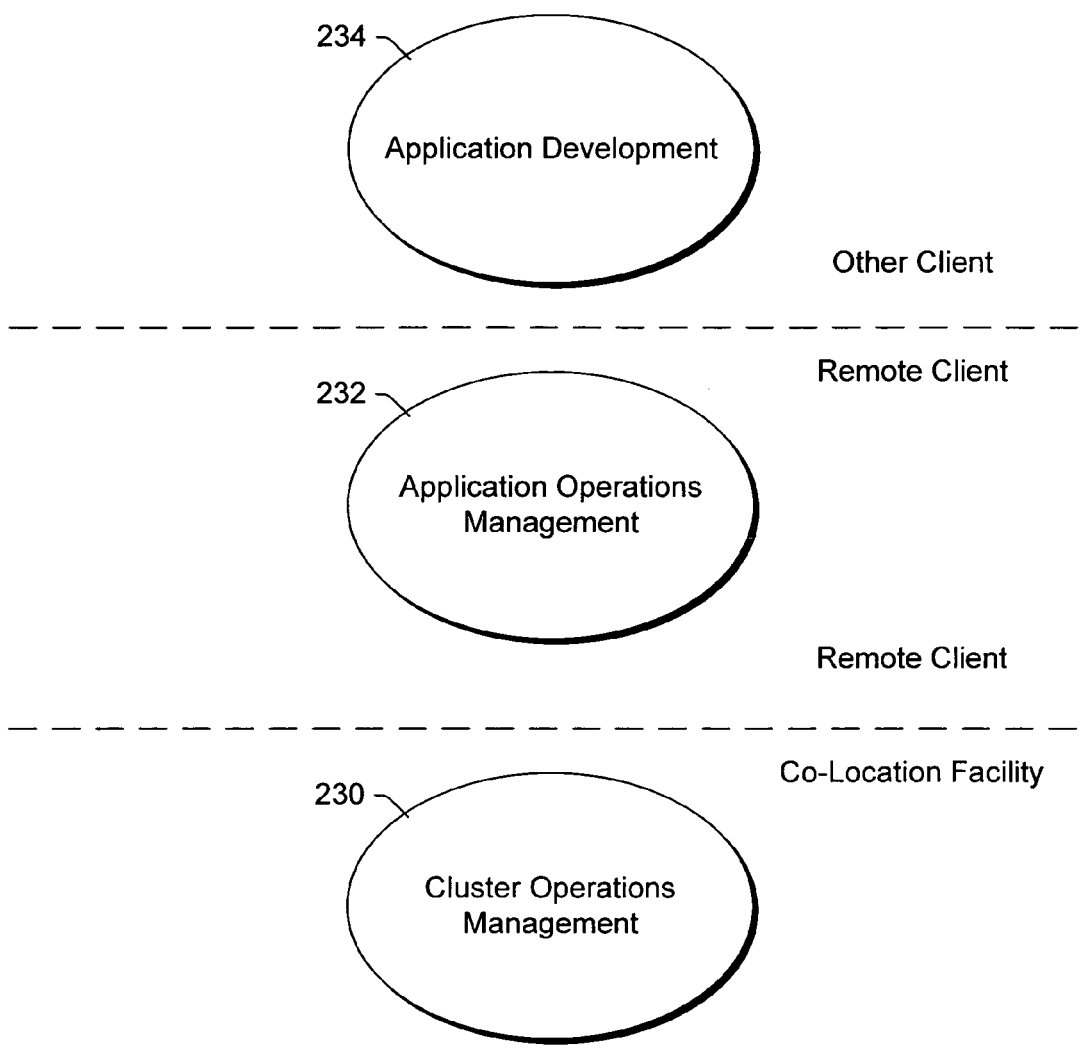
FIG. 4 is a block diagram illustrating an exemplary multi-tiered server cluster management architecture.

Management of each node 210 is carried out in a multiple-tiered manner. FIG. 4 is a block diagram illustrating an exemplary multi-tiered management architecture. The multi-tiered architecture includes three tiers: a cluster operations management tier 230, an application operations management tier 232, and an application development tier 234. Cluster operations management tier 230 is implemented locally at the same location as the server(s) being managed (e.g., at a co-location facility) and involves managing the hardware operations of the server(s). In the illustrated example, cluster operations management tier 230 is not concerned with what software components are executing on the nodes 210, but only with the continuing operation of the hardware of nodes 210 and establishing any boundaries between clusters of nodes.

The application operations management tier 232, on the other hand, is implemented at a remote location other than where the server(s) being managed are located (e.g., other than the co-location facility), but from a client computer that is still communicatively coupled to the server(s). The application operations management tier 232 involves managing the software operations of the server(s) and defining any sub-boundaries within server clusters. The client can be coupled to the server(s) in any of a variety of manners, such as via the Internet or via a dedicated (e.g., dial-up) connection. The client can be coupled continually to the server(s), or alternatively sporadically (e.g., only when needed for management purposes).

The application development tier 234 is implemented on another client computer at a location other than the server(s) (e.g., other than at the co-location facility) and involves development of software components or engines for execution on the server(s). Alternatively, current software on a node 210 at co-location facility 104 could be accessed by a remote client to develop additional software components or engines for the node. Although the client at which application development tier 234 is implemented is typically a different client than that at which application operations management tier 232 is implemented, tiers 232 and 234 could be implemented (at least in part) on the same client.

Although only three tiers are illustrated in FIG. 4, alternatively the multi-tiered architecture could include different numbers of tiers. For example, the application operations management tier may be separated into two tiers, each having different (or overlapping) responsibilities, resulting in a 4-tiered architecture. The management at these tiers may occur from the same place (e.g., a single application operations management console may be shared), or alternatively from different places (e.g., two different operations management consoles).

Returning to FIG. 3, co-location facility 104 includes a cluster operations management console for each server cluster. In the example of FIG. 3, cluster operations management console 240 corresponds to cluster 212 and may be, for example, a management device 110 of FIG. 1. Cluster operations management console 240 implements cluster operations management tier 230 (FIG. 4) for cluster 212 and is responsible for managing the hardware operations of nodes 210 in cluster 212. Cluster operations management console 240 monitors the hardware in cluster 212 and attempts to identify hardware failures. Any of a wide variety of hardware failures can be monitored for, such as processor failures, bus failures, memory failures, etc. Hardware operations can be monitored in any of a variety of manners, such as cluster operations management console 240 sending test messages or control signals to the nodes 210 that require the use of particular hardware in order to respond (no response or an incorrect response indicates failure), having messages or control signals that require the use of particular hardware to generate periodically sent by nodes 210 to cluster operations management console 240 (not receiving such a message or control signal within a specified amount of time indicates failure), etc. Alternatively, cluster operations management console 240 may make no attempt to identify what type of hardware failure has occurred, but rather simply that a failure has occurred.

Once a hardware failure is detected, cluster operations management console 240 acts to correct the failure. The action taken by cluster operations management console 240 can vary based on the hardware as well as the type of failure, and can vary for different server clusters. The corrective action can be notification of an administrator (e.g., a flashing light, an audio alarm, an electronic mail message, calling a cell phone or pager, etc.), or an attempt to physically correct the problem (e.g., reboot the node, activate another backup node to take its place, etc.).

Cluster operations management console 240 also establishes cluster boundaries within co-location facility 104. The cluster boundaries established by console 240 prevent nodes 210 in one cluster (e.g., cluster 212) from communicating with nodes in another cluster (e.g., any node not in cluster 212), while at the same time not interfering with the ability of nodes 210 within a cluster from communicating with other nodes within that cluster. These boundaries provide security for the tenants' data, allowing them to know that their data cannot be communicated to other tenants' nodes 210 at facility 104 even though network connection 216 may be shared by the tenants.

In the illustrated example, each cluster of co-location facility 104 includes a dedicated cluster operations management console. Alternatively, a single cluster operations management console may correspond to, and manage hardware operations of, multiple server clusters. According to another alternative, multiple cluster operations management consoles may correspond to, and manage hardware operations of, a single server cluster. Such multiple consoles can manage a single server cluster in a shared manner, or one console may operate as a backup for another console (e.g., providing increased reliability through redundancy, to allow for maintenance, etc.).

An application operations management console 242 is also communicatively coupled to co-location facility 104. Application operations management console 242 may be, for example, a management device 110 of FIG. 1. Application operations management console 242 is located at a location remote from co-location facility 104 (that is, not within co-location facility 104), typically being located at the offices of the customer. A different application operations management console 242 corresponds to each server cluster of co-location facility 104, although alternatively multiple consoles 242 may correspond to a single server cluster, or a single console 242 may correspond to multiple server clusters. Application operations management console 240 implements application operations management tier 232 (FIG. 4) for cluster 212 and is responsible for managing the software operations of nodes 210 in cluster 212 as well as securing sub-boundaries within cluster 212.

Application operations management console 242 monitors the software in cluster 212 and attempts to identify software failures. Any of a wide variety of software failures can be monitored for, such as application processes or threads that are "hung" or otherwise non-responsive, an error in execution of application processes or threads, etc. Software operations can be monitored in any of a variety of manners (similar to the monitoring of hardware operations discussed above), such as application operations management console 242 sending test messages or control signals to particular processes or threads executing on the nodes 210 that require the use of particular routines in order to respond (no response or an incorrect response indicates failure), having messages or control signals that require the use of particular software routines to generate periodically sent by processes or threads executing on nodes 210 to application operations management console 242 (not receiving such a message or control signal within a specified amount of time indicates failure), etc. Alternatively, application operations management console 242 may make no attempt to identify what type of software failure has occurred, but rather simply that a failure has occurred.

Once a software failure is detected, application operations management console 242 acts to correct the failure. The action taken by application operations management console 242 can vary based on the hardware as well as the type of failure, and can vary for different server clusters. The corrective action can be notification of an administrator (e.g., a flashing light, an audio alarm, an electronic mail message, calling a cell phone or pager, etc.), or an attempt to correct the problem (e.g., reboot the node, re-load the software component or engine image, terminate and re-execute the process, etc.).

Thus, the management of a node 210 is distributed across multiple managers, regardless of the number of other nodes (if any) situated at the same location as the node 210. The multi-tiered management allows the hardware operations management to be separated from the application operations management, allowing two different consoles (each under the control of a different entity) to share the management responsibility for the node.

Figure 5:
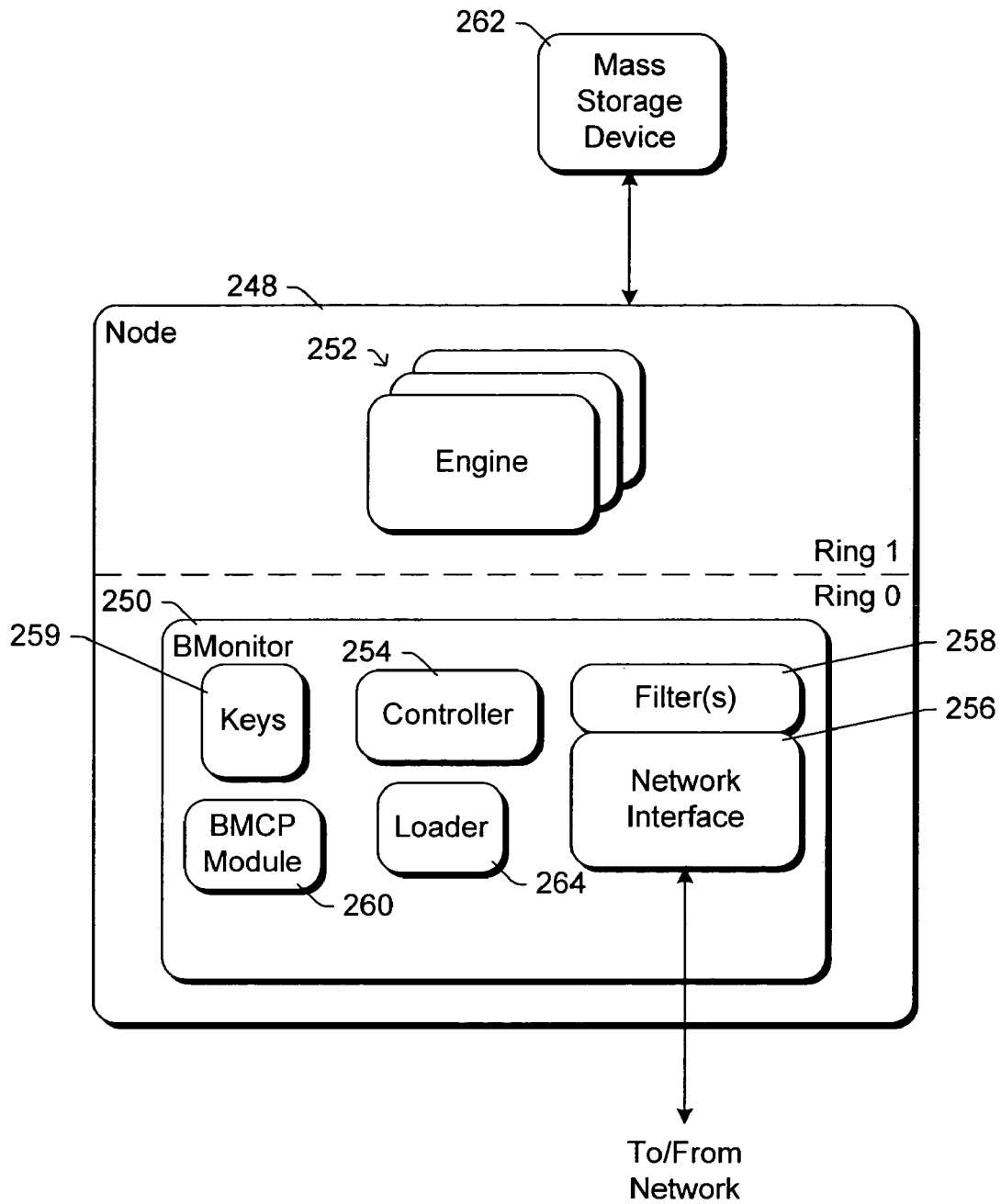
FIG. 5 is a block diagram illustrating an exemplary node of a co-location facility in more detail in accordance with certain embodiments of the invention.

FIG. 5 is a block diagram illustrating an exemplary remotely managed node in more detail in accordance with certain embodiments of the invention. Node 248 can be a node 210 of a co-location facility, or alternatively a separate device (e.g., a client 102 or server 112 of FIG. 1). Node 248 includes a monitor 250, referred to as the "BMonitor", and a plurality of software components or engines 252, and is coupled to (or alternatively incorporates) a mass storage device 262. In the illustrated example, node 248 is a computing device having a processor(s) that supports multiple privilege levels (e.g., rings in an x86 architecture processor). In the illustrated example, these privilege levels are referred to as rings, although alternate implementations using different processor architectures may use different nomenclature. The multiple rings provide a set of prioritized levels that software can execute at, often including 4 levels (Rings 0, 1, 2, and 3). Ring 0 is typically referred to as the most privileged ring. Software processes executing in Ring 0 can typically access more features (e.g., instructions) than processes executing in less privileged Rings. Furthermore, a processor executing in a particular Ring cannot alter code or data in a higher priority ring. In the illustrated example, BMonitor 250 executes in Ring 0, while engines 252 execute in Ring 1 (or alternatively Rings 2 and/or 3). Thus, the code or data of BMonitor 250 (executing in Ring 0) cannot be altered directly by engines 252 (executing in Ring 1).

Rather, any such alterations would have to be made by an engine 252 requesting BMonitor 250 to make the alteration (e.g., by sending a message to BMonitor 250, invoking a function of BMonitor 250, etc.). Implementing BMonitor 250 in Ring 0 protects BMonitor 250 from a rogue or malicious engine 252 that tries to bypass any restrictions imposed by BMonitor 250.

Alternatively, BMonitor 250 may be implemented in other manners that protect it from a rogue or malicious engine 252. For example, node 248 may include multiple processors—one (or more) processor(s) for executing engines 252, and another processor(s) to execute BMonitor 250. By allowing only BMonitor 250 to execute on a processor(s) separate from the processor(s) on which engines 252 are executing, BMonitor 250 can be effectively shielded from engines 252.

BMonitor 250 is the fundamental control module of node 248—it controls (and optionally includes) both the network interface card and the memory manager. By controlling the network interface card (which may be separate from BMonitor 250, or alternatively BMonitor 250 may be incorporated on the network interface card), BMonitor 250 can control data received by and sent by node 248. By controlling the memory manager, BMonitor 250 controls the allocation of memory to engines 252 executing in node 248 and thus can assist in preventing rogue or malicious engines from interfering with the operation of BMonitor 250.

Although various aspects of node 248 may be under control of BMonitor 250 (e.g., the network interface card), BMonitor 250 still makes at least part of such functionality available to engines 252 executing on the node 248. BMonitor 250 provides an interface (e.g., via controller 254 discussed in more detail below) via which engines 252 can request access to the functionality, such as to send data out to another node 248 within a co-location facility or on the Internet. These requests can take any of a variety of forms, such as sending messages, calling a function, etc.

BMonitor 250 includes controller 254, network interface 256, one or more filters 258, one or more keys 259, and a BMonitor Control Protocol (BMCP) module 260. Network interface 256 provides the interface between node 248 and the network (e.g., network 108 of FIG. 1). Filters 258 identify other nodes 248 in a co-location facility (and/or other sources or targets (e.g., coupled to Internet 108 of FIG. 1) that data can (or alternatively cannot) be sent to and/or received from. The nodes or other sources/targets can be identified in any of a wide variety of manners, such as by network address (e.g., Internet Protocol (IP) address), some other globally unique identifier, a locally unique identifier (e.g., a numbering scheme proprietary or local to co-location facility 104), etc.

Filters 258 can fully restrict access to a node (e.g., no data can be received from or sent to the node), or partially restrict access to a node. Partial access restriction can take different forms. For example, a node may be restricted so that data can be received from the node but not sent to the node (or vice versa). By way of another example, a node may be restricted so that only certain types of data (e.g., communications in accordance with certain protocols, such as HTTP) can be received from and/or sent to the node. Filtering based on particular types of data can be implemented in different manners, such as by communicating data in packets with header information that indicate the type of data included in the packet.

Filters 258 can be added by one or more management devices 110 of FIG. 1 or either of application operations management console 242 or cluster operations management console 240 of FIG. 3. In the illustrated example, filters added by cluster operations management console 240 (to establish cluster boundaries) restrict full access to nodes (e.g., any access to another node can be prevented) whereas filters added by application operations management console 242 (to establish sub-boundaries within a cluster) or management device 110 can restrict either full access to nodes or partial access.

Controller 254 also imposes some restrictions on what filters can be added to filters 258. In the multi-tiered management architecture illustrated in FIGS. 3 and 4, controller 254 allows cluster operations management console 240 to add any filters it desires (which will define the boundaries of the cluster). However, controller 254 restricts application operations management console 242 to adding only filters that are at least as restrictive as those added by console 240. If console 242 attempts to add a filter that is less restrictive than those added by console 240 (in which case the sub-boundary may extend beyond the cluster boundaries), controller 254 refuses to add the filter (or alternatively may modify the filter so that it is not less restrictive). By imposing such a restriction, controller 254 can ensure that the sub-boundaries established at the application operations management level do not extend beyond the cluster boundaries established at the cluster operations management level.

Controller 254, using one or more filters 258, operates to restrict data packets sent from node 248 and/or received by node 248. All data intended for an engine 252, or sent by an engine 252, to another node, is passed through network interface 256 and filters 258. Controller 254 applies the filters 258 to the data, comparing the target of the data (e.g., typically identified in a header portion of a packet including the data) to acceptable (and/or restricted) nodes (and/or network addresses) identified in filters 258. If filters 258 indicate that the target of the data is acceptable, then controller 254 allows the data to pass through to the target (either into node 248 or out from node 248). However, if filters 258 indicate that the target of the data is not acceptable, then controller 254 prevents the data from passing through to the target. Controller 254 may return an indication to the source of the data that the data cannot be passed to the target, or may simply ignore or discard the data.

The application of filters 258 to the data by controller 254 allows the boundary restrictions of a server cluster (FIG. 3) to be imposed. Filters 258 can be programmed (e.g., by application operations management console 242 of FIG. 3) with the node addresses of all the nodes within the server cluster (e.g., cluster 212). Controller 254 then prevents data received from any node not within the server cluster from being passed through to an engine 252, and similarly prevents any data being sent to a node other than one within the server cluster from being sent. Similarly, data received from Internet 108 (FIG. 1) can identify a target node 248 (e.g., by IP address), so that controller 254 of any node other than the target node will prevent the data from being passed through to an engine 252. Furthermore, as filters 258 can be readily modified by cluster operations management console 240, server cluster boundaries can be easily changed to accommodate changes in the server cluster (e.g., addition of nodes to and/or removal of nodes from the server cluster).

BMCP module 260 implements the Distributed Host Control Protocol (DHCP), allowing BMonitor 250 (and thus node 248) to obtain an IP address from a DHCP server (e.g., cluster operations management console 240 of FIG. 3). During an initialization process for node 248, BMCP module 260 requests an IP address from the DHCP server, which in turn provides the IP address to module 260. Additional information regarding DHCP is available from Microsoft Corporation of Redmond, Washington.

Software engines 252 include any of a wide variety of conventional software components. Examples of engines 252 include an operating system (e.g., Windows NT®), a load balancing server component (e.g., to balance the processing load of multiple nodes 248), a caching server component (e.g., to cache data and/or instructions from another node 248 or received via the Internet), a storage manager component (e.g., to manage storage of data from another node 248 or received via the Internet), etc. In one implementation, each of the engines 252 is a protocol-based engine, communicating with BMonitor 250 and other engines 252 via messages and/or function calls without requiring the engines 252 and BMonitor 250 to be written using the same programming language.

Controller 254, in conjunction with loader 264, is responsible for controlling the execution of engines 252. This control can take different forms, including beginning or initiating execution of an engine 252, terminating execution of an engine 252, re-loading an image of an engine 252 from a storage device, debugging execution of an engine 252, etc. Controller 254 receives instructions from application operations management console 242 of FIG. 3 or a management device(s) 110 of FIG. 1 regarding which of these control actions to take and when to take them. In the event that execution of an engine 252 is to be initiated (including re-starting an engine whose execution was recently terminated), controller 254 communicates with loader 264 to load an image of the engine 252 from a storage device (e.g., device 262, ROM, etc.) into the memory (e.g., RAM) of node 248. Loader 264 operates in a conventional manner to copy the image of the engine from the storage device into memory and initialize any necessary operating system parameters to allow execution of the engine 252. Thus, the control of engines 252 is actually managed by a remote device, not locally at the same location as the node 248 being managed.

Controller 254 also provides an interface via which application operations management console 242 of FIG. 3 or a management device(s) 110 of FIG. 1 can identify filters to add (and/or remove) from filter set 258.

Controller 254 also includes an interface via which cluster operations management console 240 of FIG. 3 can communicate commands to controller 254. Different types of hardware operation oriented commands can be communicated to controller 254 by cluster operations management console 240, such as re-booting the node, shutting down the node, placing the node in a low-power state (e.g., in a suspend or standby state), changing cluster boundaries, changing encryption keys (if any), etc.

Controller 254 further optionally provides encryption support for BMonitor 250, allowing data to be stored securely on mass storage device 262 (e.g., a magnetic disk, an optical disk, etc.) and secure communications to occur between node 248 and an operations management console (e.g., console 240 or 242 of FIG. 3) or other management device (e.g., management device 110 of FIG. 1). Controller 254 maintains multiple encryption keys 259, which can include a variety of different keys such as symmetric keys (secret keys used in secret key cryptography), public/private key pairs (for public key cryptography), etc. to be used in encrypting and/or decrypting data.

BMonitor 250 makes use of public key cryptography to provide secure communications between node 248 and the management consoles (e.g., consoles 240 or 242 of FIG. 3) or other management devices (e.g., management device(s) 110 of FIG. 1). Public key cryptography is based on a key pair, including both a public key and a private key, and an encryption algorithm. The encryption algorithm can encrypt data based on the public key such that it cannot be decrypted efficiently without the private key. Thus, communications from the public-key holder can be encrypted using the public key, allowing only the private-key holder to decrypt the communications. Any of a variety of public key cryptography techniques may be used, such as the well-known RSA (Rivest, Shamir, and Adelman) encryption technique. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

BMonitor 250 is initialized to include a public/private key pair for both the landlord and the tenant. These key pairs can be generated by BMonitor 250, or alternatively by some other component and stored within BMonitor 250 (with that other component being trusted to destroy its knowledge of the key pair). As used herein, U refers to a public key and R refers to a private key. The public/private key pair for the landlord is referred to as ($U_L$, $R_L$), and the public/private key pair for the tenant is referred to as ($U_T$, $R_T$). BMonitor 250 makes the public keys $U_L$ and $U_T$ available to the landlord, but keeps the private keys $R_L$ and $R_T$ secret. In the illustrated example, BMonitor 250 never divulges the private keys $R_L$ and $R_T$, so both the landlord and the tenant can be assured that no entity other than the BMonitor 250 can decrypt information that they encrypt using their public keys (e.g., via cluster operations management console 240 and application operations management console 242 of FIG. 3, respectively).

Once the landlord has the public keys $U_L$ and $U_T$, the landlord can assign node 248 to a particular tenant, giving that tenant the public key $U_T$. Use of the public key $U_T$ allows the tenant to encrypt communications to BMonitor 250 that only BMonitor 250 can decrypt (using the private key $R_T$). Although not required, a prudent initial step for the tenant is to request that BMonitor 250 generate a new public/private key pair ($U_T$, $R_T$). In response to such a request, controller 254 or a dedicated key generator (not shown) of BMonitor 250 generates a new public/private key pair in any of a variety of well-known manners, stores the new key pair as the tenant key pair, and returns the new public key $U_T$ to the tenant. By generating a new key pair, the tenant is assured that no other entity, including the landlord, is aware of the tenant public key $U_T$. Additionally, the tenant may also have new key pairs generated at subsequent times.

Having a public/private key pair in which BMonitor 250 stores the private key and the tenant knows the public key allows information to be securely communicated from the tenant to BMonitor 250. In order to ensure that information can be securely communicated from BMonitor 250 to the tenant, an additional public/private key pair is generated by the tenant and the public key portion is communicated to BMonitor 250. Any communications from BMonitor 250 to the tenant can thus be encrypted using this public key portion, and can be decrypted only by the holder of the corresponding private key (that is, only by the tenant).

BMonitor 250 also maintains, as one of keys 259, a disk key which is generated based on one or more symmetric keys (symmetric keys refer to secret keys used in secret key cryptography). The disk key, also a symmetric key, is used by BMonitor 250 to store information in mass storage device 262. BMonitor 250 keeps the disk key secure, using it only to encrypt data node stored on mass storage device 262 and decrypt data node retrieved from mass storage device 262 (thus there is no need for any other entities, including any management device, to have knowledge of the disk key).

Use of the disk key ensures that data stored on mass storage device 262 can only be decrypted by the node that encrypted it, and not any other node or device. Thus, for example, if mass storage device 262 were to be removed and attempts made to read the data on device 262, such attempts would be unsuccessful. BMonitor 250 uses the disk key to encrypt data to be stored on mass storage device 262 regardless of the source of the data. For example, the data may come from a client device (e.g., client 102 of FIG. 1) used by a customer of the tenant, from a management device (e.g., a device 110 of FIG. 1 or a console 240 or 242 of FIG. 3), etc.

In one implementation, the disk key is generated by combining the storage keys corresponding to each management device. The storage keys can be combined in a variety of different manners, and in one implementation are combined by using one of the keys to encrypt the other key, with the resultant value being encrypted by another one of the keys, etc.

Additionally, BMonitor 250 operates as a trusted third party mediating interaction among multiple mutually distrustful management agents that share responsibility for managing node 248. For example, the landlord and tenant for node 248 do not typically fully trust one another. BMonitor 250 thus operates as a trusted third party, allowing the lessor and lessee of node 248 to trust that information made available to BMonitor 250 by a particular entity or agent is accessible only to that entity or agent, and no other (e.g., confidential information given by the lessor is not accessible to the lessee, and vice versa). BMonitor 250 uses a set of layered ownership domains (ODs) to assist in creating this trust. An ownership domain is the basic unit of authentication and rights in BMonitor 250, and each managing entity or agent (e.g., the lessor and the lessee) corresponds to a separate ownership domain (although each managing entity may have multiple management devices from which it can exercise its managerial responsibilities).

Figure 6:
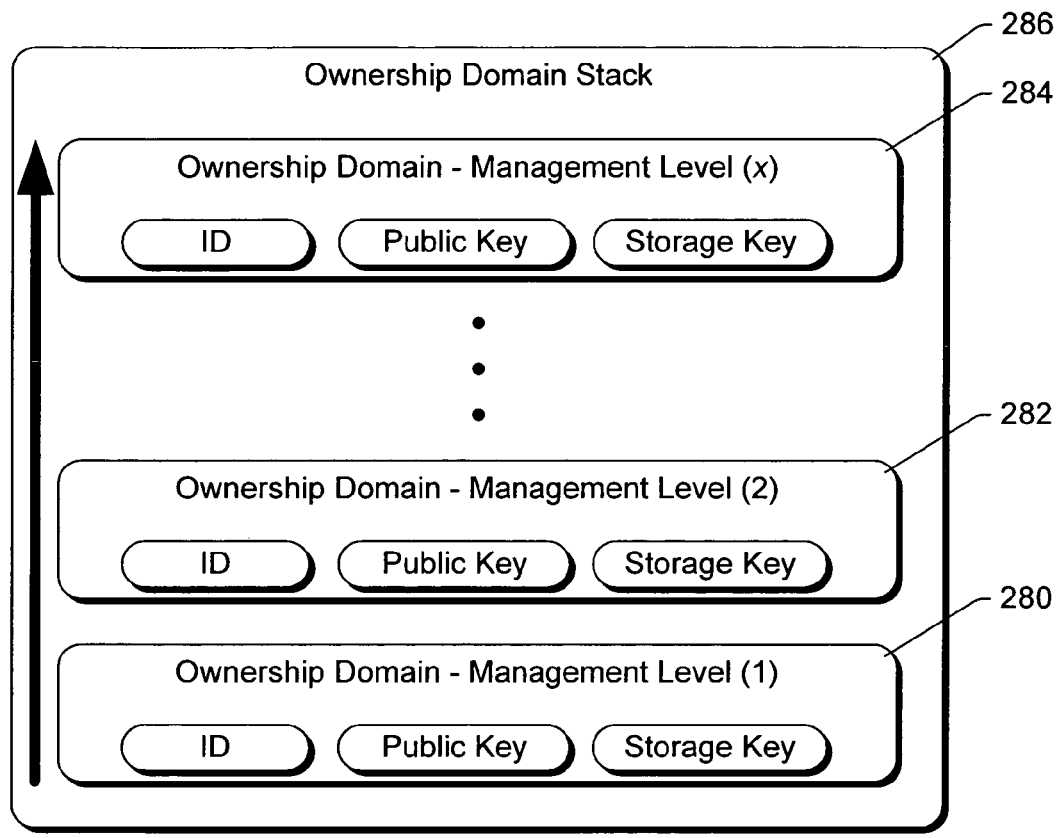
FIG. 6 is a block diagram illustrating an exemplary set of ownership domains in accordance with certain embodiments of the invention.

FIG. 6 is a block diagram illustrating an exemplary set of ownership domains in accordance with certain embodiments of the invention. Multiple (x) ownership domains 280, 282, and 284 are organized as an ownership domain stack 286. Each ownership domain 280–284 corresponds to a particular managerial level and one or more management devices (e.g., device(s) 110 of FIG. 1, consoles 240 and 242 of FIG. 3, etc.). The base or root ownership domain 280 corresponds to the actual owner of the node, such as the landlord discussed above. The next lowest ownership domain 282 corresponds to the entity that the owner of the hardware leases the hardware to (e.g., the tenant discussed above). A management device in a particular ownership domain can set up another ownership domain for another management device that is higher on ownership domain stack 286. For example, the entity that the node is leased to can set up another ownership domain for another entity (e.g., to set up a cluster of nodes implementing a database cluster).

When a new ownership domain is created, it is pushed on top of ownership domain stack 286. It remains the top-level ownership domain until either it creates another new ownership domain or its rights are revoked. An ownership domain's rights can be revoked by a device in any lower-level ownership domain on ownership domain stack 286, at which point the ownership domain is popped from (removed from) stack 286 along with any other higher-level ownership domains. For example, if the owner of node 248 (ownership domain 280) were to revoke the rights of ownership domain 282, then ownership domains 282 and 284 would be popped from ownership domain stack 286.

Each ownership domain has a corresponding set of rights. In the illustrated example, the top-level ownership domain has one set of rights that include: (1) the right to push new ownership domains on the ownership domain stack; (2) the right to access any system memory in the node; (3) the right to access any mass storage devices in or coupled to the node; (4) the right to modify (add, remove, or change) packet filters at the node; (5) the right to start execution of software engines on the node (e.g., engines 252 of FIG. 5); (6) the right to stop execution of software engines on the node, including resetting the node; (7) the right to debug software engines on the node; (8) the right to change its own authentication credentials (e.g., its public key or ID); (9) the right to modify its own storage key; (10) the right to subscribe to events engine events, machine events, and/or packet filter events (e.g., notify a management console or other device when one of these events occurs). Additionally, each of the lower-level ownership domains has another set of rights that include: (1) the right to pop an existing ownership domain(s); (2) the right to modify (add, remove, or change) packet filters at the node; (3) the right to change its own authentication credentials (e.g., public key or ID); and (4) the right to subscribe to machine events and/or packet filter events. Alternatively, some of these rights may not be included (e.g., depending on the situation, the right to debug software engines on the node may not be needed), or other rights may be included (e.g., the top-level node may include the right to pop itself off the ownership domain stack).

Ownership domains can be added to and removed from ownership domain stack 286 numerous times during operation. Which ownership domains are removed and/or added varies based on the activities being performed. By way of example, if the owner of node 248 (corresponding to root ownership domain 280) desires to perform some operation on node 248, all higher-level ownership domains 282–284 are revoked, the desired operation is performed (ownership domain 280 is now the top-level domain, so the expanded set of rights are available), and then new ownership domains can be created and added to ownership domain stack 286 (e.g., so that the management agent previously corresponding to the top-level ownership domain is returned to its previous position).

BMonitor 250 checks, for each request received from an entity corresponding to one of the ownership domains (e.g., a management console controlled by the entity), what rights the ownership domain has. If the ownership domain has the requisite rights for the request to be implemented, then BMonitor 250 carries out the request. However, if the ownership domain does not have the requisite set of rights, then the request is not carried out (e.g., an indication that the request cannot be carried out can be returned to the requestor, or alternatively the request can simply be ignored).

In the illustrated example, each ownership domain includes an identifier (ID), a public key, and a storage key. The identifier serves as a unique identifier of the ownership domain, the public key is used to send secure communications to a management device corresponding to the ownership domain, and the storage key is used (at least in part) to encrypt information stored on mass storage devices. An additional private key may also be included for each ownership domain for the management device corresponding to the ownership domain to send secure communications to the BMonitor. When the root ownership domain 280 is created, it is initialized (e.g., by BMonitor 250) with its ID and public key. The root ownership domain 280 may also be initialized to include the storage key (and a private key), or alternatively it may be added later (e.g., generated by BMonitor 250, communicated to BMonitor 250 from a management console, etc.). Similarly, each time a new ownership domain is created, the ownership domain that creates the new ownership domain communicates an ID and public key to BMonitor 250 for the new ownership domain. A storage key (and a private key) may also be created for the new ownership domain when the new ownership domain is created, or alternatively at a later time.

BMonitor 250 authenticates a management device(s) corresponding to each of the ownership domains. BMonitor does not accept any commands from a management device until it is authenticated, and only reveals confidential information (e.g., encryption keys) for a particular ownership domain to a management device(s) that can authenticate itself as corresponding to that ownership domain. This authentication process can occur multiple times during operation of the node, allowing the management devices for one or more ownership domains to change over time. The authentication of management devices can occur in a variety of different manners. In one implementation, when a management device requests a connection to BMonitor 250 and asserts that it corresponds to a particular ownership domain, BMonitor 250 generates a token (e.g., a random number), encrypts the token with the public key of the ownership domain, and then sends the encrypted token to the requesting management device. Upon receipt of the encrypted token, the management device decrypts the token using its private key, and then returns the decrypted token to BMonitor 250. If the returned token matches the token that BMonitor 250 generated, then the authenticity of the management device is verified (because only the management device with the corresponding private key would be able to decrypt the token). An analogous process can be used for BMonitor 250 to authenticate itself to the management device.

Once authenticated, the management device can communicate requests to BMonitor 250 and have any of those requests carried out (assuming it has the rights to do so). Although not required, it is typically prudent for a management console, upon initially authenticating itself to BMonitor 250, to change its public key/private key pair.

When a new ownership domain is created, the management device that is creating the new ownership domain can optionally terminate any executing engines 252 and erase any system memory and mass storage devices. This provides an added level of security, on top of the encryption, to ensure that one management device does not have access to information stored on the hardware by another management device. Additionally, each time an ownership domain is popped from the stack, BMonitor 250 terminated any executing engines 252, erases the system memory, and also erases the storage key for that ownership domain. Thus, any information stored by that ownership domain cannot be accessed by the remaining ownership domains—the memory has been erased so there is no data in memory, and without the storage key information on the mass storage device cannot be decrypted. BMonitor 250 may alternatively erase the mass storage device too. However, by simply erasing the key and leaving the data encrypted, BMonitor 250 allows the data to be recovered if the popped ownership domain is re-created (and uses the same storage key).

Figure 7:
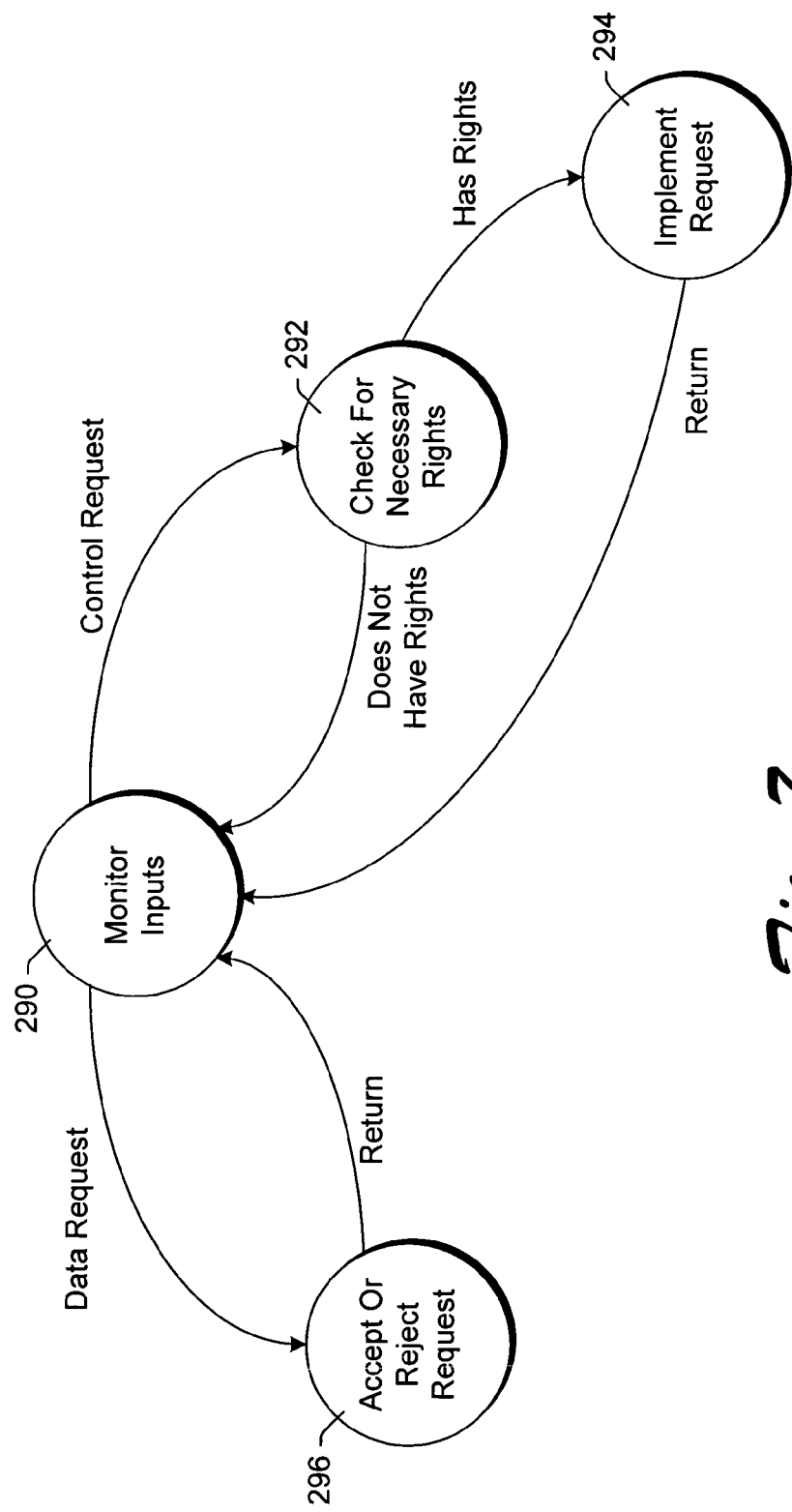
FIG. 7 is a flow diagram illustrating the general operation of a BMonitor in accordance with certain embodiments of the invention.

FIG. 7 is a flow diagram illustrating the general operation of BMonitor 250 in accordance with certain embodiments of the invention. Initially, BMonitor 250 monitors the inputs it receives (block 290). These inputs can be from a variety of different sources, such as another node 248, a client computer via network connection 216 (FIG. 3), client operations management console 240, application operations management console 242, an engine 252, a management device 110 (FIG. 1), etc.

If the received request is a control request (e.g., from one of consoles 240 or 242 of FIG. 1, or a management device(s) 110 of FIG. 1), then a check is made (based on the top-level ownership domain) as to whether the requesting device has the necessary rights for the request (block 292). If the requesting device does not have the necessary rights, then BMonitor 250 returns to monitoring inputs (block 290) without implementing the request. However, if the requesting device has the necessary rights, then the request is implemented (block 294), and BMonitor 250 continues to monitor the inputs it receives (block 290). However, if the received request is a data request (e.g., inbound from another node 248 or a client computer via network connection 216, outbound from an engine 252, etc.), then BMonitor 250 either accepts or rejects the request (act 296), and continues to monitor the inputs it receives (block 290). Whether BMonitor 250 accepts a request is dependent on the filters 258 (FIG. 5), as discussed above.

Figure 8:
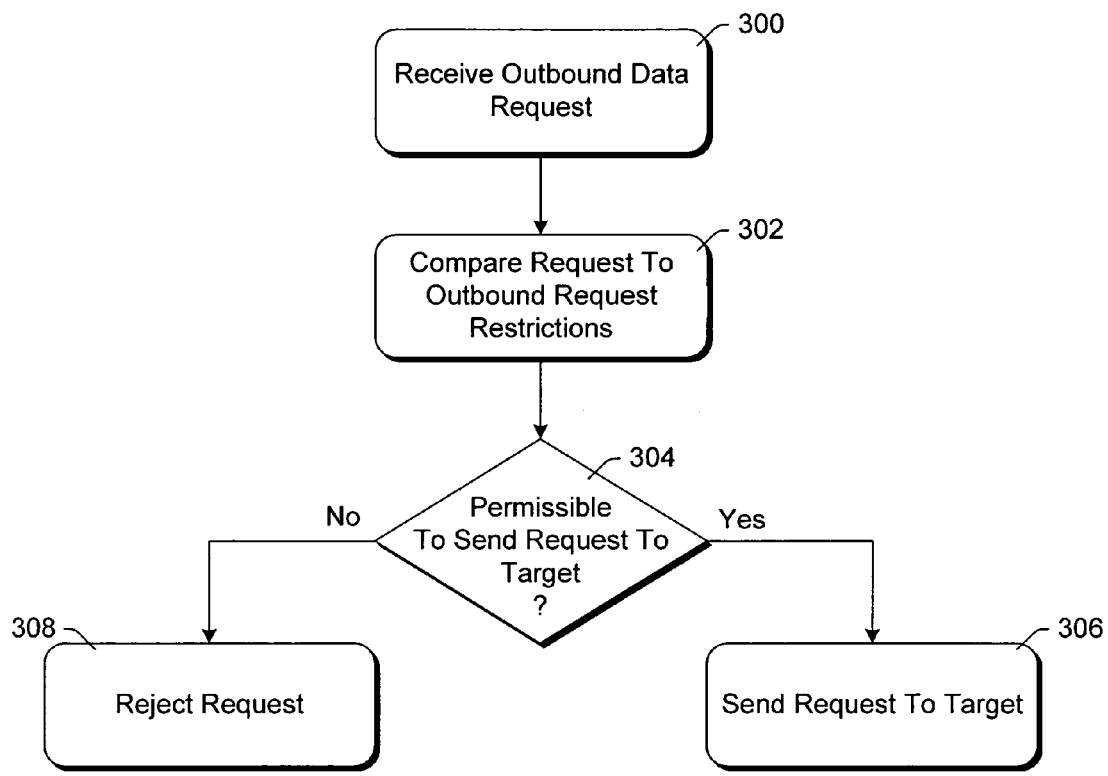
FIG. 8 is a flowchart illustrating an exemplary process for handling outbound data requests in accordance with certain embodiments of the invention.

FIG. 8 is a flowchart illustrating an exemplary process for handling outbound data requests in accordance with certain embodiments of the invention. The process of FIG. 8 is implemented by BMonitor 250 of FIG. 5, and may be performed in software. The process of FIG. 8 is discussed with additional reference to components in FIGS. 1, 3 and 5.

Initially, the outbound data request is received (act 300). Controller 254 compares the request to outbound request restrictions (act 302). This comparison is accomplished by accessing information corresponding to the data (e.g., information in a header of a packet that includes the data or information inherent in the data, such as the manner (e.g., which of multiple function calls is used) in which the data request was provided to BMonitor 250) to the outbound request restrictions maintained by filters 258. This comparison allows BMonitor 250 to determine whether it is permissible to pass the outbound data request to the target (act 304). For example, if filters 258 indicate which targets data cannot be sent to, then it is permissible to pass the outbound data request to the target only if the target identifier is not identified in filters 258.

If it is permissible to pass the outbound request to the target, then BMonitor 250 sends the request to the target (act 306). For example, BMonitor 250 can transmit the request to the appropriate target via transport medium 211 (and possibly network connection 216), or via another connection to network 108. However, if it is not permissible to pass the outbound request to the target, then BMonitor 250 rejects the request (act 308). BMonitor 250 may optionally transmit an indication to the source of the request that it was rejected, or alternatively may simply drop the request.

Figure 9:
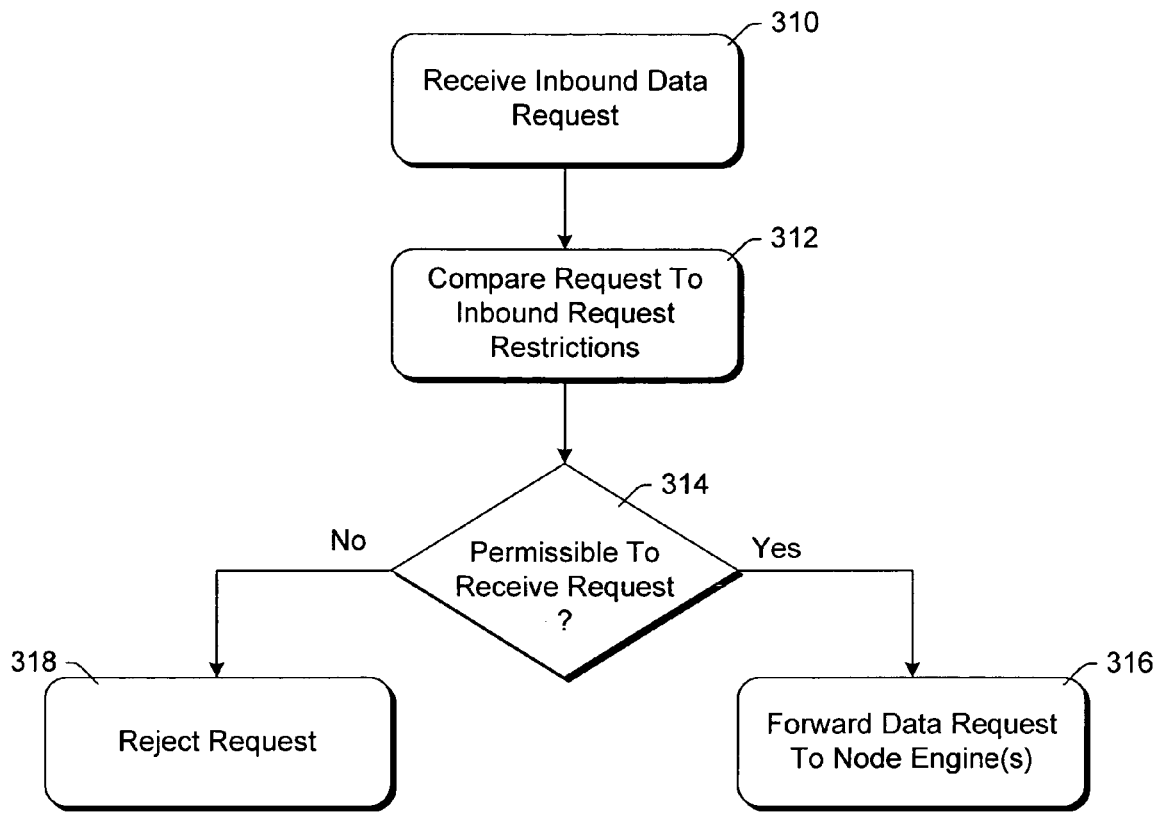
FIG. 9 is a flowchart illustrating an exemplary process for handling inbound data requests in accordance with certain embodiments of the invention.

FIG. 9 is a flowchart illustrating an exemplary process for handling inbound data requests in accordance with certain embodiments of the invention. The process of FIG. 9 is implemented by BMonitor 250 of FIG. 5, and may be performed in software. The process of FIG. 9 is discussed with additional reference to components in FIG. 5.

Initially, the inbound data request is received (act 310). Controller 254 compares the request to inbound request restrictions (act 312). This comparison is accomplished by accessing information corresponding to the data to the inbound request restrictions maintained by filters 258. This comparison allows BMonitor 250 to determine whether it is permissible for any of software engines 252 to receive the data request (act 314). For example, if filters 258 indicate which sources data can be received from, then it is permissible for an engine 252 to receive the data request only if the source of the data is identified in filters 258.

If it is permissible to receive the inbound data request, then BMonitor 250 forwards the request to the targeted engine(s) 252 (act 316). However, if it is not permissible to receive the inbound data request from the source, then BMonitor 250 rejects the request (act 318). BMonitor 250 may optionally transmit an indication to the source of the request that it was rejected, or alternatively may simply drop the request.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer-readable media having stored thereon instructions that, when executed by one or more processors, cause the one or more processors to:
    associate each of a plurality of management agents with one of a plurality of ownership domains, wherein each of the plurality of management agents is responsible for managing at least a portion of a computer and is external to the computer;
    allow only one of the plurality of management agents to have an extended set of rights to the computer at a time, and assign the remaining management devices a more limited set of rights, wherein the more limited set of rights includes: the right to revoke an existing ownership domain and the right to modify filters in the computer, including the right to add a filter that cannot be subverted by a management agent assigned to the top-level ownership domain; and
    restrict which requests from management devices corresponding to the plurality of management agents are carried out based at least in part on the rights of the management agent.

2. One or more computer-readable media as recited in claim 1, wherein the more limited set of rights further includes: the right to change authentication credentials for the ownership domain, and the right to subscribe to machine events and packet filter events at the computer.

3. One or more computer-readable media as recited in claim 1, wherein each of the plurality of management agents corresponds to one or more management devices that are coupled to the computer.

4. One or more computer-readable media as recited in claim 1, wherein the instructions further cause the one or more processors to terminate execution of a software engine in the computer in response to a request from a management device corresponding to the one of the plurality of management agents having the extended set of rights.

5. One or more computer-readable media as recited in claim 1, wherein the instructions further cause the one or more processors to initiate execution of a software engine in the computer in response to a request from a management device corresponding to the one of the plurality of management agents having the extended set of rights.

6. One or more computer-readable media as recited in claim 1, wherein the computer comprises a node in a co-location facility.

7. One or more computer-readable media having stored thereon instructions that, when executed by one or more processors, cause the one or more processors to:
    associate each of a plurality of management agents with one of a plurality of ownership domains, wherein each of the plurality of management agents is responsible for managing at least a portion of a computer and is external to the computer;
    allow only one of the plurality of management agents to have an extended set of rights to the computer at a time, and assign the remaining management devices a more limited set of rights, wherein the extended set of rights includes: the right to create new ownership domains, the right to access system memory, the right to access a mass storage device of the computer, and the right to modify filters in the computer; and
    restrict which requests from management devices corresponding to the plurality of management agents are carried out based at least in part on the rights of the management agent.

8. One or more computer-readable media as recited in claim 7, wherein the extended set of rights further includes: the right to start execution of software engines in the computer, the right to stop execution of software engines in the computer, the right to debug software engines in the computer, the right to change authentication credentials for the ownership domain, the right to modify a storage key for the ownership domain, and the right to subscribe to events engine events, machine events, and packet filter events at the computer.

9. One or more computer-readable media as recited in claim 7, wherein each of the plurality of management agents corresponds to one or more management devices that are coupled to the computer.

10. One or more computer-readable media as recited in claim 7, wherein the instructions further cause the one or more processors to terminate execution of a software engine in the computer in response to a request from a management device corresponding to the one of the plurality of management agents having the extended set of rights.

11. One or more computer-readable media as recited in claim 7, wherein the instructions further cause the one or more processors to initiate execution of a software engine in the computer in response to a request from a management device corresponding to the one of the plurality of management agents having the extended set of rights.

12. One or more computer-readable media as recited in claim 7, wherein the computer comprises a node in a co-location facility.

13. A system comprising:
    interface means for allowing management devices corresponding to a plurality of management agents responsible for managing the system to access the system; and
    controller means for operating as a trusted third party mediating interaction among the plurality of management agents by assigning each of the plurality of management agents to a different one of a plurality of ownership domains and restricting the rights of each ownership domain in the system, wherein one of the plurality of ownership domains is a top-level ownership domain having a first set of rights, wherein each of the other ownership domains in the plurality of ownership domains has a second set of rights, and wherein the second set of rights includes: the right to revoke an existing ownership domain, the right to modify filters in the system, the right to change authentication credentials for the ownership domain, and the right to subscribe to machine events and packet filter events at the system.

14. A system as recited in claim 13, wherein the right to modify filters in the system includes the right to add a filter that cannot be subverted by a management agent assigned to the top-level ownership domain.

15. A system as recited in claim 13, where each of the plurality of management agents corresponds to one or more management devices that are coupled to the system.

16. A system as recited in claim 13, wherein the system comprises a node in a co-location facility.

17. A system comprising:

interface means for allowing management devices corresponding to a plurality of management agents responsible for managing the system to access the system; and controller means for operating as a trusted third party mediating interaction among the plurality of management agents by assigning each of the plurality of management agents to a different one of a plurality of ownership domains and restricting the rights of each ownership domain in the system, wherein one of the plurality of ownership domains is a top-level ownership domain having a first set of rights, wherein each of the other ownership domains in the plurality of ownership domains has a second set of rights, and wherein the first set of rights includes: the right to create new ownership domains, the right to access system memory, the right to access a mass storage device of the system, and the right to modify filters in the system.

18. A system as recited in claim 17, wherein the first set of rights further includes: the right to start execution of software engines in the system, the right to stop execution of software engines in the system, the right to debug software engines in the system, the right to change authentication credentials for the ownership domain, the right to modify a storage key for the ownership domain, and the right to subscribe to events engine events, machine events, and packet filter events at the system.

19. A system as recited in claim 17, where each of the plurality of management agents corresponds to one or more management devices that are coupled to the system.

20. A system as recited in claim 17, wherein the system comprises a node in a co-location facility.

21. A computer comprising:
a processor; and
a memory, coupled to the processor, storing instructions that, when executed by the processor, cause the processor to:
associate each of a plurality of management agents with one of a plurality of ownership domains, wherein each of the plurality of management agents is responsible for managing at least a portion of a computer and is external to the computer;
allow only one of the plurality of management agents to have an extended set of rights to the computer at a time, and assign the remaining management devices a more limited set of rights, wherein the extended set of rights includes: the right to create new ownership domains, the right to access system memory, the right to access a mass storage device of the computer, and the right to modify filters in the computer; and
restrict which requests from management devices corresponding to the plurality of management agents are carried out based at least in part on the rights of the management agent.

22. A computer as recited in claim 21, wherein the extended set of rights further includes: the right to start execution of software engines in the computer, the right to stop execution of software engines in the computer, the right to debug software engines in the computer, the right to change authentication credentials for the ownership domain, the right to modify a storage key for the ownership domain, and the right to subscribe to events engine events, machine events, and packet filter events at the computer.

23. A computer as recited in claim 21, wherein each of the plurality of management agents corresponds to one or more management devices that are coupled to the computer.

24. A computer as recited in claim 21, wherein the instructions further cause the processor to terminate execution of a software engine in the computer in response to a request from a management device corresponding to the one of the plurality of management agents having the extended set of rights.

25. A computer as recited in claim 21, wherein the instructions further cause the processor to initiate execution of a software engine in the computer in response to a request from a management device corresponding to the one of the plurality of management agents having the extended set of rights.

26. A computer as recited in claim 21, wherein the computer comprises a node in a co-location facility.

* * * * *

UNITED STATES PATENT AND TRADEMARK OFFICE
CERTIFICATE OF CORRECTION

| | | |
|---|---|---|
| PATENT NO. | : 7,043,545 B2 | Page 1 of 1 |
| APPLICATION NO. | : 11/007828 | |
| DATED | : May 9, 2006 | |
| INVENTOR(S) | : Bassam Tabbara et al. | |

It is certified that error appears in the above-identified patent and that said Letters Patent is hereby corrected as shown below:

On the Title Page on page 2, Item (56), under "U.S. Patent Documents", line 28, after "3/2004" delete "Charkraborty et al." and insert -- Chakraborty et al. --, therefor.

On the Title Page on page 2, Item (56), under "Other Publications", line 6, delete "Distrubuted" and insert -- Distributed --, therefor.

On the Title Page on page 2, Item (56), under "Other Publications", line 12, delete "Distrubuted" and insert -- Distributed --, therefor.

In column 1, line 9, after "2000" insert -- , --.

In column 5, line 37, delete "(ROM)" and insert -- (ROMs) --, therefor.

In column 7, line 41, after "or" delete "in to" and insert -- into --, therefor.

In column 11, line 43, after "facility" delete "(".

Signed and Sealed this

Thirtieth Day of March, 2010

David J. Kappos
*Director of the United States Patent and Trademark Office*